United States Patent Office 3,256,105
Patented June 14, 1966

3,256,105
CERAMIC MOLDING COMPOSITION, ARTICLES MADE FROM SAME AND PROCESS FOR MAKING SUCH ARTICLES
Harvey E. Alford, Amherst, and Franklin Veatch, Cleveland, Ohio, assignors to The Standard Oil Company, Cleveland, Ohio, a corporation of Ohio
No Drawing. Filed Sept. 26, 1963, Ser. No. 311,666
17 Claims. (Cl. 106—40)

This invention relates to ceramic molding compositions, to a method of making kiln-fired ceramic articles therefrom, and to the kiln-fired ceramic articles so made.

The ceramic molding compositions of this invention comprise a major proportion (by weight and volume) of hollow glass microspheres and a minor proportion (by weight and volume) of a binder comprising sodium silicate, boric acid and clay.

Preferred ceramic molding compositions of this invention comprise from about 6 to about 14 parts by weight of hollow glass microspheres, and a binder comprising from about 1 to about 2.5 parts by weight of solid, pulverized sodium silicate; from about 0.5 to about 6 parts by weight of pulverized, fused boric acid; and from about 0.5 to about 1.5 parts by weight of clay such as kaolin, bentonite, attapulgite, montmorillonite, etc. The ratio of microspheres to binder is more conveniently expressed in volumetric terms and on this basis the preferred range is from about 2 volumes of microspheres per volume of binder to about 7 volumes of microspheres per volume of binder.

Especially preferred ceramic molding compositions will contain from about 2 to about 6 volumes of microspheres per volume of a binder comprising 2 parts by weight pulverized sodium silicate, 1 part by weight pulverized, fused boric acid and 1 part by weight kaolin.

In addition to the above ingredients, the binder portion of the molding compositions may advantageously contain from 0 to about 2 parts by weight of a sodium silicate solution and/or from 0 to about 2 parts by weight of a surface-active agent. The advantages of these additional ingredients will be discussed more fully hereinafter.

Hollow glass microspheres which may be used in the ceramic molding compositions of the present invention include those disclosed in application Serial No. 144,838, filed October 13, 1961, and in U. S. Patents 2,978,339; 2,978,340 and 3,030,215. The microspheres so disclosed may be characterized as hollow discrete spheres of fused glass having diameters in the range of 5 to 5000 microns and preferably 10 to 500 microns; and wall thickness of from 0.5 to 10% and preferably 0.75 to 1.5% of their diameters. The gas density of a mass of such spheres will range from 0.1 to 0.75 and preferably from 0.25 to 0.45. The particles may be composed of silica or an alkali-metal silicate-based glass such as a sodium silicate, alumino silicate or zinc silicate based glass. Borosilicate glasses are particularly suitable.

The glass microspheres per se form no part of the present invention and for this reason so much of the aforementioned patent application and three patents as relates to glass microspheres and to their method of manufacture is incorporated by reference in the present disclosure to permit a complete understanding of the nature of hollow microspheres suitable for use in practicing the present invention.

The ceramic molding compositions of the present invention may be used to advantage in making virtually any ceramic article which will benefit from a unique combination of properties, including light-weight, thermal resistance and high strength to weight ratio. Hundreds of specific applications in the electronic, aerospace and packaging industries will immediately suggest themselves to those skilled in the art.

One especially suitable application lies in the food service industry which has long sought a multifunctional, disposable (and therefore inexpensive), ceramic-like article in which food can be packed, stored, cooked and served. It is envisioned that such ceramic-like articles would be provided with either raw, semi-cooked or fully cooked food, then stored under preserving conditions, e.g., freezing, irradiation, vacuum, etc., and prepared for serving, as by heating and/or cooking, depending on whether the food as packed was raw, semi or fully cooked. Ultimately the food would be served for consumption in these very same ceramic-like articles.

This system lends itself to high volume food service with a minimum of preparation, labor and waste, which makes it very attractive for institutional use, as in hospitals, schools, the armed services, prisons and the like.

The housewife will also appreciate the convenience of being able to buy individual meals, or family-size servings of entrees, vegetables, desserts, etc., all in ceramic ware, handsome enough to serve in and inexpensive enough to throw away after use.

The ceramic like articles may be formed in any desired shape, including plates, dishes, bowls, cups, mugs, casserole dishes, partitioned serving trays, and the like.

The method of making the kiln-fired ceramic articles of this invention involves broadly the steps adding sufficient liquid (usually water) to the dry ceramic molding composition to provide a workable molding consistency, molding an article from the resulting mix, drying the molded article to remove physically trapped liquid and finally kiln-firing the dried article to remove residual liquid and fuse the binder to the hollow glass microspheres.

The amount of liquid required to provide a workable molding consistency will in large measure depend on the molding technique to be used. For instance, hand throwing will generally require about 0.25–1 volume of liquid per volume of dry molding composition; wet pressure molding, about 0.1–0.5 volume of liquid per volume of dry molding; and dry pressure molding, on the order of 0.5–5 vol. percent liquid. In general, no advantage will be realized by using more than 2 volumes of liquid per volume of dry molding composition, and in any event, since whatever liquid is added for molding purposes must be removed during the drying and firing steps, it is economically desirable to add the least amount of liquid which will provide a workable molding consistency for the particular molding technique employed.

Where the molding composition is to contain additional, liquid ingredients, such as a sodium silicate solution and a surface-active agent as mentioned above, these liquid ingredients will first be admixed with enough make-up liquid, usually water, to provide the desired gross liquid concentration required, and then the dry ingredients will be added to provide a composition of workable molding consistency.

Molding may be accomplished in any conventional technique such as hand throwing, wet pressure molding or dry pressure molding, centrifugal molding, stamping, etc. Wet pressure molding using a pair of mated dies has been found to be a very satisfactory procedure, especially for a high speed semi-automatic or automatic operation. According to this technique a pre-measured quantity of molding composition in paste or slurry form is fed to a female die half. This is then covered with the male die half with the exertion of from 100–1000 p.s.i. and preferably from 200–500 p.s.i. The article may then be released from the dies and free dried or transferred to heated drying dies. Alternatively, the molding dies may also serve as heated drying dies. The drying step, if in dies, may be augmented by the use of vacuum or pressure to speed up the drying process. As another alternative, the articles may be partially dried while disposed within dies, and the residual moisture removed under free drying conditions.

The drying and kiln-firing steps may be conducted as a single, continuous operation or as two separate steps. Since the function of the drying step is to remove physically trapped liquid, this operation will be conducted at temperatures ranging from room temperature to somewhat above the boiling temperature of the liquid. Where the liquid is water, the upper limit will be on the order of 220–250° F.

The primary function of the kiln-firing step is to fuse the binder to the glass microspheres, and to this end, the operation will be conducted at gradually increasing temperatures ranging upwardly to about 1100–1200° F.

Since most heating equipment does not operate at peak efficiency over the broad temperature range required for drying and kiln-firing the molded articles, it is preferable to perform these operations in separate steps, using the most suitable equipment available. Drying may be accomplished in virtually any low temperature oven, including direct-fired gas, infrared, microwave, induction, etc. The firing step requires a standard ceramic-firing kiln, muffle furnace or the like.

The length of duration of the drying step will vary over wide limits depending on the amount of liquid present and the heating means used. In one comparative experiment, all things being equal except the heating means, a molded article was dried very satisfactorily in an infrared oven in four and one-half minutes while equally satisfactory drying in a convection oven took three-quarters of an hour. The prime consideration in selecting an appropriate drying schedule is that excessively rapid drying can vaporize the liquid faster than the vapors can escape from the molded article, resulting in explosive fragmentation. As the molding composition, liquid content and/or heating means is varied, optimization experiments will have to be run to establish a suitable heating schedule.

The kiln-firing step can similarly vary in duration over wide limits, depending on the thickness of the molded article and its ability to withstand thermal stresses without cracking, as well as the rate at which the kiln temperature can be raised to the fusion point of the binder. In general, however, satisfactory firing can be accomplished by gradually elevating the temperature to about 1100–1200° F. over a period of about 30–90 minutes and preferably about 45–60 minutes, then maintaining the temperature at about 1100–1200° F. for about 1–120 minutes and preferably 30–90 minutes.

It was noted above that the basic binder portion of the ceramic molding composition, comprising solid sodium silicate, boric acid and clay, may be modified to additionally contain from 0 to about 2 parts by weight of a sodium silicate solution and/or from 0 to about 2 parts by weight of a surface-active agent. The liquid sodium silicate when present improves the mold release properties of the molding composition and imparts a smoother surface to the molded article. The surface-active agent also improves the mold release properties and in addition improves the flow properties of the molding composition, and permits the use of lower molding pressures, i.e., 100–200 p.s.i. less than for compositions where the surface-active agent is absent. Typical surface-active agents found suitable for these purposes include sodium alcohol sulfates, aliphatic amines, quaternary ammonium salts, fatty acid esters of sorbitans and polyethylene glycols, etc.

The following examples describe the best mode contemplated for carrying out the present invention.

EXAMPLE I

A binder was prepared by admixing in equal parts by weight, solid, pulverized sodium silicate, fused boric acid and kaolin.

Portions of this binder were then admixed with hollow glass microspheres (produced in accordance with the teachings of U.S. Patent 2,978,340) to provide ceramic molding compositions having microsphere to binder ratios (on a volume basis) of 3:1, 4:1, 5:1 and 6:1, respectively.

To each of these ceramic molding compositions was added enough water to provide a workable molding consistency for wet pressure molding. In each case this amounted to about 0.1 volume of water per volume of molding composition.

Utilizing a mated pair of steel dies, designed to form a shallow, circular dish 3⅜ inches in diameter, 1³⁄₁₆ inches deep, and ⅛ inches thick, a portion of each of the moistened molding compositions was placed in the mold cavity and placed under a pressure of 200 p.s.i.

The resulting "green" articles were removed from the mold and free dried in an oven for 45 minutes at temperatures gradually increasing from room temperature (75° F.) to a maximum of 220° F.

The dried articles were then placed in a muffle furnace which was heated gradually to a temperature of 1100° F. over a period of 50 minutes and maintained at 1100° F. for a period of 90 minutes.

Each of the compositions produced a very satisfactory kiln-fired ceramic dish. The density of each dish was 0.53 gm./cc. and as a group they had Shore D hardness values ranging from 45.52 and flexural strengths ranging from 486–530 p.s.i.

EXAMPLE II

The procedure of Example I was repeated except that the binder used here contained two parts by weight of sodium silicate to one part by weight of each of boric acid and kaolin.

The densities and hardness of the kiln-fired ceramic dishes prepared from these compositions were comparable to the values reported in Example I; however, the flexural strengths were somewhat higher, ranging from 684–750 p.s.i.

EXAMPLE III

The procedure of Example I was repeated except that the binder used here contained one part by weight sodium silicate, six parts by weight boric acid and one part by weight kaolin.

The flexural strengths of the kiln-fired ceramic dishes prepared from these compositions were comparable to those reported in Example I; however, the densities were somewhat higher, ranging from 0.55–0.62 gm./cc. and the Shore D hardness values were somewhat higher, ranging from 55–60.

EXAMPLE IV

A binder was prepared by admixing two parts by weight of solid, pulverized sodium silicate, and one part by weight of each of boric acid and kaolin.

To this binder was added hollow glass microspheres (produced in accordance with the teachings of U.S. Patent 2,978,340) in an amount to provide a microsphere to binder ratio (on a volume basis) of 6:1.

Separately admixed were two parts by weight of a 49% aqueous sodium silicate solution, eight-tenths part by weight of sodium lauryl sulfate as a surface-active agent and sufficient make-up water to provide 0.1 volume of liquid per volume of solids in the molding composition. These last three ingredients were admixed with the microsphere-binder mixture to provide a ceramic molding composition of workable consistency for wet pressure molding.

A portion of the ceramic molding composition was placed in the mated pair of steel dies described in Example I. The composition flowed sufficiently well so that a molding pressure of 100 p.s.i. was found to be adequate. This is about half the minimum pressure required for compositions not containing a surface-active agent.

The resulting "green" article parted cleanly and easily from the mold with the exertion of considerably less force than was required to remove molded articles formed from compositions not containing the liquid sodium silicate and surface-active agent.

The article was dried and fired in accordance with the schedules described in Example I, and the fired product was found to have a somewhat smoother surface when compared to the articles produced in accordance with Example I.

The density, Shore D hardness and flexural strength values were all comparable to those for the 6:1 microsphere-binder article produced in accordance with Example I. Thus the processing advantages contributed by the liquid sodium silicate and surface-active agent were not offset by a compromise in other properties of the finished article.

Various modifications of the invention disclosed herein will occur to those skilled in the art. For instance, it may be desirable to provide the kiln-fired ceramic articles with a ceramic glaze on one or both surfaces. Such a glaze may be applied and fused in conjunction with the kiln-firing step, or as a separate post-firing step. In addition, the compositions may also be modified to include pigments or other colorants, opacifiers and the like to enhance the appearance of the ceramic articles. It is our intention to cover all such modifications as can reasonably be interpreted as falling within the scope of the following claims:

We claim:

1. A ceramic molding composition consisting essentially of (1) hollow microspheres of fused glass having diameters within the range of from 5 to 5000 microns, wall thicknesses within the range of from 0.5 to 10% of their diameters, and gas densities within the range of from 0.1 to 0.75 and (2) a binder comprising from about 1 to about 2.5 parts by weight of solid sodium silicate, from about 0.5 to about 6 parts by weight of boric acid, from about 0.5 to about 1.5 parts by weight of clay, from 0 to about 2 parts by weight of a sodium silicate solution and from 0 to about 2 parts by weight of a surface-active agent, said microspheres being present in an amount within the range of from 2 to 7 volumes per volume of binder.

2. The composition of claim 1 in which said clay is kaolin.

3. A ceramic molding composition consisting essentially of (1) hollow microspheres of fused glass having diameters within the range of from 5 to 5000 microns, wall thicknesses within the range of from 0.5 to 10% of their diameters, and gas densities within the range of from 0.1 to 0.75 and (2) a binder comprising 2 parts by weight of solid sodium silicate, 1 part by weight boric acid and 1 part by weight clay, said microspheres being present in an amount within the range of from 2 to 6 volumes per volume of binder.

4. The composition of claim 3 in which the clay ingredient is kaolin.

5. The composition of claim 4 in which the binder additionally contains 2 parts by weight of an aqueous sodium silicate solution and 0.8 part by weight of a sodium alcohol sulfate surface-active agent.

6. A molded article formed from a composition consisting essentially of (1) hollow microspheres of fused glass having diameters within the range of from 5 to 5000 microns, wall thicknesses within the range of from 0.5 to 10% of their diameters, and gas densities within the range of from 0.1 to 0.75 and (2) a binder comprising from about 1 to about 2.5 parts by weight of solid sodium silicate, from about 0.5 to about 6 parts by weight of boric acid, from about 0.5 to about 1.5 parts by weight of clay, from 0 to about 2 parts by weight of a sodium silicate solution and from 0 to about 2 parts by weight of a surface-active agent, said microspheres being present in an amount within the range of from 2 to 7 volumes per volume of binder.

7. The molded article of claim 6 in which the clay in said binder is kaolin.

8. A molded article formed from a composition consisting essentially of (1) hollow microspheres of fused glass having diameters within the range of from 5 to 5000 microns, wall thicknesses within the range of from 0.5 to 10% of their diameters, and gas densities within the range of from 0.1 to 0.75 and (2) a binder comprising 2 parts by weight of solid sodium silicate, 1 part by weight boric acid and 1 part by weight clay, said microspheres being present in an amount within the range of from 2 to 6 volumes per volume of binder.

9. The molded article of claim 8 in which the clay in said binder is kaolin.

10. The molded article of claim 9 in which said binder additionally contains 2 parts by weight of an aqueous sodium silicate solution and 0.8 part by weight of a sodium alcohol sulfate surface-active agent.

11. A fired ceramic article consisting essentially of (1) hollow microsphere of fused glass having diameters within the range of from 5 to 5000 microns, wall thicknesses within the range of from 0.5 to 10% of their diameters and gas densities within the range of from 0.1 to 0.75 and (2) a binder for said microspheres consisting essentially of the fusion product of a mixture of from about 1 to about 2.5 parts by weight of solid sodium silicate, from about 0.5 to about 6 parts by weight of boric acid, from about 0.5 to about 1.5 parts by weight of clay, from 0 to about 2 parts by weight of a sodium silicate solution, and from 0 to about 2 parts by weight of a surface-active agent, said microspheres being present in an amount within the range of from 2 to 7 volumes per volume of binder.

12. The ceramic article of claim 11 in which said clay is kaolin.

13. A fired ceramic article comprising (1) hollow microspheres of fused glass having diameters within the range of from 5 to 5000 microns, wall thicknesses within the range of from 0.5 to 10% of their diameters, and gas densities within the range of from 0.1 to 0.75 and (2) a binder for said microspheres consisting essentially of the fusion product of a mixture of 2 parts by weight of solid sodium silicate, 1 part by weight of boric acid and 1 part by weight of clay.

14. The ceramic article of claim 13 in which the clay in said binder is kaolin.

15. The ceramic article of claim 14 in which said binder additionally contains 2 parts by weight of an aqueous sodium silicate solution and 0.8 part by weight of a sodium alcohol sulfate surface-active agent.

16. A method of making a ceramic article which comprises the steps of admixing from 2 to 7 volumes of hollow microspheres of fused glass having diameters within the range of from 5 to 5000 microns, wall thicknesses within the range of from 0.5 to 10% of their diameters, and gas densities within the range of from 0.1 to 0.75, with 1 volume of a dry binder consisting essentially of from about 1 to about 2.5 parts by weight of sodium silicate, from about 0.5 to about 6 parts by weight of boric acid and from about 0.5 to about 1.5 parts by weight of clay, separately admixing up to 2 parts by weight of an aqueous solution of sodium silicate, up to 2 parts by weight of a surface-active agent and sufficient make-up liquid to provide a workable molding composition, adding this separate admixture to the microsphere-dry binder mixture to provide a ceramic molding composition, molding an article therefrom, drying said article to remove the liquid therefrom and heating the dried article at an elevated temperature sufficiently high to fuse said binder.

17. The method of claim 16 in which said make-up liquid is water and said drying is conducted at temperatures up to 220–250° F. and said fusion is conducted at temperatures up to 1100–1200° F.

References Cited by the Examiner
UNITED STATES PATENTS

| | | | |
|---|---|---|---|
| 2,553,759 | 5/1951 | Geiger | 106—40 |
| 2,797,201 | 5/1957 | Veatch et al. | 106—40 |

TOBIAS E. LEVOW, *Primary Examiner.*

J. POER, *Assistant Examiner.*